United States Patent
Lopez Moreno et al.

(10) Patent No.: US 10,580,401 B2
(45) Date of Patent: Mar. 3, 2020

(54) SUB-MATRIX INPUT FOR NEURAL NETWORK LAYERS

(71) Applicant: Google LLC, Mountain View, CA (US)

(72) Inventors: Ignacio Lopez Moreno, New York, NY (US); Yu-hsin Joyce Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 618 days.

(21) Appl. No.: 14/613,493

(22) Filed: Feb. 4, 2015

(65) Prior Publication Data

US 2016/0217367 A1 Jul. 28, 2016

Related U.S. Application Data

(60) Provisional application No. 62/108,237, filed on Jan. 27, 2015.

(51) Int. Cl.
| | |
|---|---|
| *G10L 15/16* | (2006.01) |
| *G06N 3/04* | (2006.01) |
| *G10L 17/18* | (2013.01) |
| *G10L 15/08* | (2006.01) |

(52) U.S. Cl.
CPC ............ *G10L 15/16* (2013.01); *G06N 3/0454* (2013.01); *G10L 17/18* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 6,366,897 B1 | 4/2002 | Means | |
| 8,027,532 B2 | 9/2011 | Marcon | |
| 2007/0288242 A1* | 12/2007 | Spengler | G10L 15/20 704/275 |
| 2010/0027820 A1* | 2/2010 | Kates | G10L 25/00 381/312 |
| 2012/0016678 A1* | 1/2012 | Gruber | G10L 15/22 704/275 |
| 2014/0180989 A1 | 6/2014 | Krizhevsky | |
| 2015/0127336 A1* | 5/2015 | Lei | G10L 17/18 704/232 |

(Continued)

OTHER PUBLICATIONS

Abdel-Hamid et al, Exploring Convolutional Neural Network Structures and Optimization Techniques for Speech Recognition, 2013.*

(Continued)

*Primary Examiner* — Li B. Zhen
*Assistant Examiner* — Mikayla Chubb
(74) *Attorney, Agent, or Firm* — Fish & Richardson P.C.

(57) ABSTRACT

Methods, systems, and apparatus, including computer programs encoded on computer storage media, for training a neural network. One of the methods includes generating, by a speech recognition system, a matrix from a predetermined quantity of vectors that each represent input for a layer of a neural network, generating a plurality of sub-matrices from the matrix, using, for each of the sub-matrices, the respective sub-matrix as input to a node in the layer of the neural network to determine whether an utterance encoded in an audio signal comprises a keyword for which the neural network is trained.

19 Claims, 8 Drawing Sheets

(56) References Cited

U.S. PATENT DOCUMENTS

| | | | | |
|---|---|---|---|---|
| 2015/0127342 A1* | 5/2015 | Sharifi | ............... | G10L 17/02 704/239 |
| 2015/0269931 A1* | 9/2015 | Senior | ............... | G10L 15/063 704/245 |
| 2016/0293167 A1* | 10/2016 | Chen | ............... | G10L 17/18 |

OTHER PUBLICATIONS

Chen et al, Small-footprint keyword spotting using deep neural networks, 2014.*

Han et al, Speech Emotion Recognition Using Deep Neural Network and Extreme Learning Machine, 2014.*

Variani et al, Deep neural networks for small footprint text-dependent speaker verification, 2014.*

Abdel-Hamid et al, Applying Convolutional Neural Networks Concepts to Hybrid NN-HMM Model for Speech Recognition, 2012.*

Abdel-Hamid et al, Exploring Convolutional Neural Network Structures and Optimization Techniques for Speech Recognition, 2014.*

Canovas et al, Using Permutations to Find Structural Changes in Time Series (Year: 2011).*

"Convolutional neural network", from Wikipedia, the free encyclopedia, downloaded from the internet on Jan. 8, 2015, http://en.wikipedia.org/wiki/Convolutional_neural_network 8 pages.

Peng's Blog, "Fully-connected, locally-connected and shared weights layer in neural networks", posted on Apr. 11, 2014 by Pennlio, downloaded from the internet on Jan. 7, 2015, https://pennlio.wordpress.com/2014/04/11/fully-connected-locally-connected-and-shared-weights-layer-in-neural-networks/, 3 pages.

Uetz, Rafael et al., "Locally-connected Hierarchical Neural Neworks for GPU-accelerated Object recognition", In Proceeding of NOPS 2009 Workshop on Large-Scale Machine Learning: Parallelism and Massive Datasets, Whistler, Canada, Dec. 2009 4 pages.

* cited by examiner

SUB-MATRIX INPUT FOR NEURAL NETWORK LAYERS

CROSS-REFERENCE TO RELATED APPLICATION

This application claims the benefit of U.S. Provisional Application No. 62/108,237, filed Jan. 27, 2015, which is incorporated by reference.

BACKGROUND

This invention relates to speech recognition using neural networks.

Automatic speech recognition is one technology that is used in mobile devices. One task that is a common goal for this technology is to be able to use voice commands to wake up and have basic spoken interactions with the device. For example, it may be desirable to recognize a "hotword" that signals that the mobile device should activate when the mobile device is in a sleep state.

SUMMARY

A neural network, e.g., a deep neural network, is trained, and used during runtime, with a reduced number of parameters provided to one or more layers in the neural network, e.g., a first layer. For instance, the first layer in the neural network may typically receive more parameters as input for each of the nodes than the other layers in the neural network and, to reduce the footprint of the neural network, e.g., the resources needed for computation, the neural network may provide a subset of the parameters to each of the nodes. The neural network may provide the same subset of parameters to each of the nodes during training and runtime. The output of the neural network may be used to determine whether a particular keyword or key phrase was spoken, whether an utterance was spoken by a particular speaker, or both.

In general, one innovative aspect of the subject matter described in this specification can be embodied in methods that include the actions of generating, by a speech recognition system, a matrix from a predetermined quantity of vectors that each represent input for a layer of a neural network, generating a plurality of sub-matrices from the matrix, using, for each of the sub-matrices, the respective sub-matrix as input to a node in the layer of the neural network to determine whether an utterance encoded in an audio signal includes a keyword for which the neural network is trained. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Generating the plurality of sub-matrices from the matrix may include generating a plurality of non-overlapping sub-matrices from the matrix. The layer may be an input layer. Generating the matrix from the predetermined quantity of vectors that each represent input for the layer of the neural network may include generating the matrix from a predetermined quantity of feature vectors that each model a portion of the audio signal encoding the utterance.

In some implementations, wherein a size of each of the sub-matrices may be the same. Generating the matrix from the predetermined quantity of vectors may include generating the matrix from a predetermined quantity of sequential vectors. Using, for each of the sub-matrices, the respective sub-matrix as input to a node in the layer of the neural network may include using, for each of the sub-matrices, the respective sub-matrix as input to a node in the layer of the neural network to determine whether the utterance was spoken by a predetermined speaker. Using, for each of the sub-matrices, the respective sub-matrix as input to a node in the layer of the neural network may include using each of the sub-matrices as input to a predetermined quantity of nodes in the layer of the neural network. Using, for each of the sub-matrices, the respective sub-matrix as input to a node in the layer of the neural network may include using the respective sub-matrix as input to a plurality of adjacent nodes in the layer of the neural network.

In some implementations, the method may include generating, for each node in the layer of the neural network, output from the node using the respective sub-matrix, determining whether the utterance includes a keyword using the output from the nodes in the layer, and performing, by a device, an action in response to determining that the utterance includes a keyword. The device may include the speech recognition system. Performing the action may include exiting, by the device, a standby state. Performing the action may include presenting, by the device, content to a user of the device. Performing the action may include performing, by the device, an action for a particular application. Performing the action for the particular application may include launching, by the device, the particular application.

The subject matter described in this specification can be implemented in particular embodiments so as to realize none, one or more of the following advantages. In some implementations, a system that uses sub-matrix input for a layer in a neural network may have a small memory footprint, low latency, low battery consumption, and/or low computational cost. In some implementations, updates to a system that uses sub-matrix input for a layer, e.g., over a network, may consume a low amount of bandwidth. In some implementations, a neural network or a deep neural network is trained to directly predict key phrases, keywords and/or sub-word units of the keywords. In some implementations, a system may make a determination about every ten milliseconds regarding whether or not a keyword or key phrase has been identified. In some implementations, a system that uses sub-matrix input may have a reduced speech recognition model, e.g., the model may be up to about twenty times smaller. In some implementations, a system that uses sub-matrix input for a layer in a neural network may have an improved neural network model, e.g., when the space saved by using sub-matrix input is used to increase the number of nodes in a layer or the number of layers in the neural network. For instance, the number of nodes in the layer that receives the sub-matrix input may be increased. In some implementations, a training system may take less time to train a neural network that uses sub-matrix input for a layer in the neural network.

The details of one or more embodiments of the subject matter of this specification are set forth in the accompanying drawings and the description below. Other features, aspects,

BRIEF DESCRIPTION OF THE DRAWINGS

Like reference numbers and designations in the various drawings indicate like elements.

DETAILED DESCRIPTION

Figure 1:
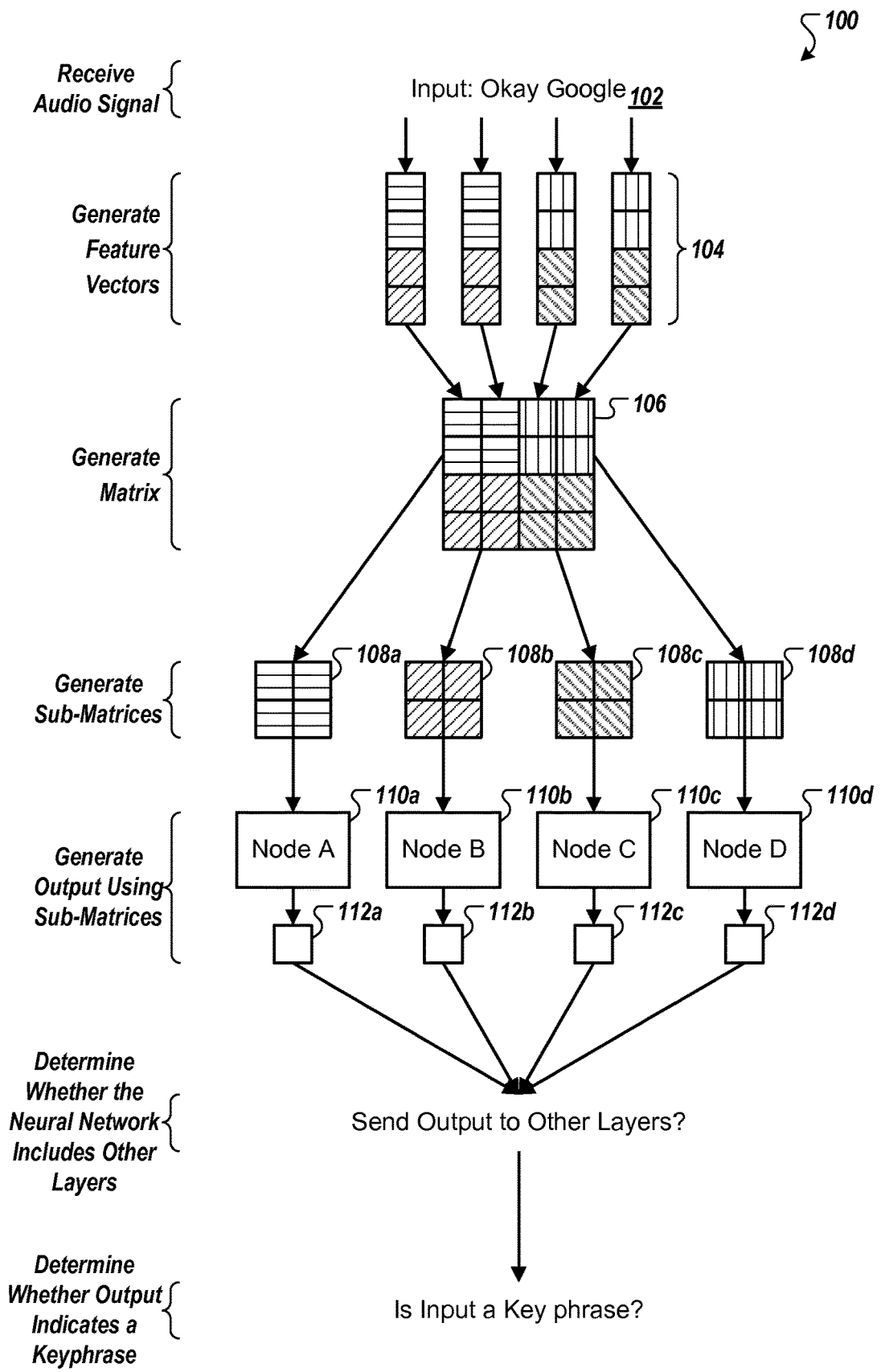
FIG. 1 is an example of a speech recognition system.

FIG. 1 is an example of a speech recognition system 100. The speech recognition system 100 includes a neural network, e.g., a deep neural network, which is trained, and used during runtime, with a reduced number of parameters provided to one or more layers in the neural network, e.g., a first layer. For instance, the first layer in the neural network may typically receive more parameters as input for each of the nodes than the other layers in the neural network and, to reduce the footprint of the neural network, e.g., the resources needed for computation, the speech recognition system 100 provides a subset of the parameters to each of the nodes. The speech recognition system 100 provides the same subset of parameters to each of the nodes during training and runtime. The output of the neural network may be used to determine whether a particular keyword or key phrase was spoken, whether an utterance was spoken by a particular speaker, or both.

In one example, the speech recognition system 100 receives an audio signal 102 encoding an utterance and generates feature vectors 104, e.g., using a feature extraction module, that represent frequency components from the audio signal, e.g., for a particular period of time. The feature extraction module may perform voice-activity detection and generates a feature vector for every frame of the audio signal. For example, the speech recognition system 100 may receive the audio signal 102, e.g., as a continuous stream of data, and split the audio signal 102 into multiple frames of data, e.g., where each frame is associated with ten milliseconds of audio stream data.

The feature extraction module may analyze each of the frames to determine feature values for the frames and places the features values in feature vectors which can be stacked, e.g., using left and right context of adjacent feature vectors, to create a larger feature vector.

The speech recognition system 100 generates a matrix 106 of the frequency components using the feature vectors 104. For example, the speech recognition system 100 uses feature vectors 104 that represent sequential portions of the audio signal 102, e.g., using a stack of feature vectors, without skipping a feature vector, or both.

The rows in the matrix 106 may represent frequencies and the columns may represent time. For instance, the frequency axis may be divided into multiple, e.g., forty, mel-filterbank energies and the time axis may be divided into multiple time windows centered on a current time in the audio signal 102. Each of the windows, for example, may have a twenty millisecond length with a fifty percent overlap across adjacent windows. In some examples, the matrix 106 has forty elements by forty elements to include information about the energy of every frequency and every twenty millisecond sub-window within a four-hundred millisecond window.

The speech recognition system 100 divides the matrix 106 into multiple sub-matrices 108a-d. For instance, the speech recognition system 100 generates four sub-matrices 108a-d that each have the same size and do not overlap, e.g., each value from the matrix 106 is included in only one of the sub-matrices 108a-d. In the example when the matrix 106 is forty by forty, each of the sub-matrices may be twenty by twenty, for four sub-matrices 108a-d, or ten by ten, when there are sixteen sub-matrices 108a-d.

The speech recognition system 100 provides each of the sub-matrices 108a-d to a subset of nodes 110a-d in a layer of the neural network. For instance, the speech recognition system 100 provides one of the sub-matrices 108a-d to each of the nodes 110a-d when there are four sub-matrices and four nodes. In another example, when there are one-hundred and twenty-eight nodes in a layer and sixteen sub-matrices, the speech recognition system 100 may provide the first sub-matrix to a first set of eight nodes, the second sub-matrix to a second set of eight nodes, and so on. The nodes in the first set of eight nodes may be adjacent to each other, e.g., without any node from another set between two of the nodes in the first set. In some examples, the speech recognition system 100 may provide each of the sub-matrices to sixteen nodes.

For instance, each of the nodes that receive the same sub-matrix may look for different patterns in the same area of the audio signal 102. In one example, one of the nodes may analyze a particular frequency for a particular window of the audio signal 102 and another of the nodes may analyze a different frequency for the particular window.

The speech recognition system 100 uses the same mapping of sub-matrices 108a-d to nodes 110a-d during training and runtime analysis. For example, when an upper left portion of the matrix 106 is used to create a first sub-matrix 108a and the first sub-matrix 108a is provided to a particular subset of nodes 110a during training, the same first sub-matrix 108a is provided to the particular subset of nodes 110a during runtime, e.g., with the sub-matrix 108a containing different values based on a respective audio signal that is being processed.

Each of the nodes 110a-d uses the values from the respective sub-matrix to generate output 112a-d, e.g., a single floating point number. The nodes 110a-d may use a non-linear function to generate the output 112a-d.

Each of the nodes 110a-d may have different weights. For instance, a first node and a second node, both of which receive the same sub-matrix, may have different weights, or optionally functions or both, which the corresponding node uses to generate output using the values in the sub-matrix.

The speech recognition system 100 receives the output 112a-d and may generate an output vector from all of the output values. In some implementations, the speech recognition system 100 provides the output vector to each of the nodes in a next layer of the neural network (not shown). In some implementations, the speech recognition system 100 provides subsets of the output vector to each of the nodes in the next layer of the neural network. The speech recognition system 100 may determine whether there are additional layers in the neural network to which the output 112*a*-*d* should be sent and, if so, send the output to the next layer to continue the process of generating a final output vector, e.g., from an output layer in the neural network. If there are no additional layers, the speech recognition system 100 may use the output 112*a*-*d* as a final output vector.

The speech recognition system 100 uses a final output vector from the neural network to determine, e.g., using a posterior handling module, whether the utterance encoded in the audio signal 102 is a keyword or key phrase, whether the keyword or key phrase was spoken by a particular user, or both. The posterior handling module may combine posterior probabilities from multiple final output vectors into a confidence score used to determine whether or not a keyword or a key phrase was included in the audio signal, e.g., included in the frames that correspond with the final output vectors.

For example, the speech recognition system 100 is trained to identify particular keywords, key phrases, e.g., "Okay Google," or both, and determines whether the utterance is one of the particular keywords or key phrases. The speech recognition system 100 may also determine whether the utterance was spoken by a particular user for which the speech recognition system 100 was trained. In some implementations, the speech recognition system 100 may be trained to perform general speech recognition, e.g., for thousands of words.

In some implementations, some of the sub-matrices may be different sizes. For instance, a training system may train the speech recognition system 100, e.g., the neural network in the speech recognition system 100, or different speech recognition systems, with different size sub-matrices and select a speech recognition system with an accuracy higher than the other speech recognition systems. In one example, the speech recognition system may include five sub-matrices with two three-by-three sub-matrices and three two-by-three sub-matrices, e.g., when the matrix is six-by-six. In some examples, different sub-matrix sizes may better exploit the locality of features in the audio signal 102.

In some implementations, some of the sub-matrices may overlap. For example, a training system may train the speech recognition system 100, or multiple speech recognition systems, with sets of sub-matrices that have different amounts of overlap, e.g., one row or column, two rows or columns, etc., and select one of those sets of sub-matrices based on an accuracy of each of the sets of sub-matrices. For instance, the speech recognition system 100 may use the set of sub-matrices that has the highest accuracy. In some implementations, the sub-matrices may overlap and have different sizes.

In some examples, the speech recognition system 100 provides each of the sub-matrices to a different number of nodes in a neural network. For instance, the speech recognition system 100 may provide a first sub-matrix to three nodes and a second sub-matrix to four nodes. In some implementations, the speech recognition system 100 provides each of the sub-matrices to a same number of nodes.

In some implementations, the feature extraction module analyzes only the portions of the audio signal that are determined to include speech to reduce computation. For example, the feature extraction module may include a voice-activity detector that may use thirteen-dimensional perceptual linear prediction (PLP) features and their deltas and double-deltas as input to a thirty-component diagonal covariance Gaussian Markov Model, to generate speech and non-speech posteriors for each frame. The feature extraction module may perform temporal smoothing on the speech and non-speech posteriors to identify regions where the speech posteriors exceed a threshold and the corresponding frame is likely to include speech.

For frames that include speech regions, the feature extraction module may generate acoustic features based on forty-dimensional mel-filterbank energies computed every ten milliseconds over a window of four hundred milliseconds. The feature extraction module may stack contiguous frames to add sufficient left and right context, e.g., as the speech recognition system 100 receives additional data and the analysis of the frames progresses, and provide feature vectors for the stack of frames to the speech recognition system 100 to use when creating the matrix 106. For example, the input window may be asymmetric since each recently received frame may add about ten milliseconds of latency to the speech recognition system 100. In some implementations, the speech recognition system 100 stacks ten recently received frames and thirty previously received frames.

The neural network may be a feed-forward fully connected neural network with k hidden layers and n hidden nodes per layer where each node computes a non-linear function of the weighted sum of the output of the previous layer. In some implementations, some of the layers may have a different number of nodes.

The nodes in the output layer may use softmax activation functions to determine an estimate of the posterior probability of each output category. The nodes in the hidden layers of the neural network may use rectified linear unit (ReLU) functions to determine output using the received input from the previous layer or the values from the feature vectors, e.g., for the initial layer of nodes.

In some implementations, the size of the neural network is determined based on the number of output categories, e.g., keywords, key phrases, filler, or a combination of two or more of these.

The output categories of the neural network can represent entire words or sub-word units in a keyword or a key-phrase. For instance, during keyword or key-phrase detection, the output categories of the neural network can represent entire words. The neural network may receive the output categories during training and the output categories may be context dependent, e.g., specific to a particular device, software application, or user. For example, the output categories may be generated at training time via forced alignment using a standard Gaussian mixture model based large vocabulary continuous speech recognition system, e.g., a dictation system.

In some implementations, the neural network may be trained with a software framework that supports distributed computation on multiple CPUs in deep neural networks. In some implementations, the neural network is trained using asynchronous stochastic gradient descent with an exponential decay for the learning rate.

Figure 2:
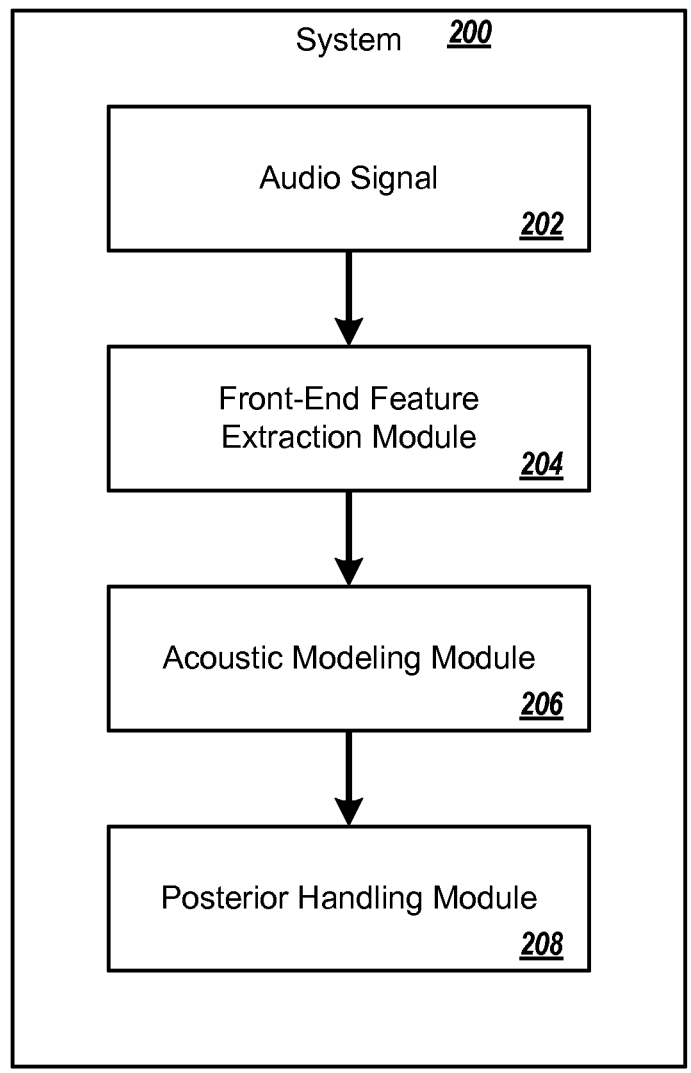
FIG. 2 is an example system for determining whether an audio signal encodes a specific keyword or key phrase.

FIG. 2 is an example system 200 for determining whether an audio signal encodes a specific keyword or key phrase. The system 200, e.g., the speech recognition system 100, receives an audio signal 202 and provides the audio signal 202 to a front-end feature extraction module 204. For example, a microphone may capture an analog or digital representation of sound as the audio signal 202 from a physical environment, e.g., that contains the microphone. The system 200 may include the microphone or another system may include the microphone and send the audio signal 202 to the system 200.

The front-end feature extraction module 204 analyzes the audio signal 202 to generate a series of feature vectors, described with reference to FIG. 3. Once the front-end feature extraction module 204 has finished the processing of the audio signal 202, the front-end feature extraction module 204 sends the features vectors to an acoustic modeling module 206.

The acoustic modeling module 206 may use a variety of techniques, described with reference to FIG. 4, to analyze the feature vectors and produce posterior probability vectors that are representative of whether or not portions of the audio signal 202 contain specific words or phrases for which the acoustic modeling module is programmed. For instance, the acoustic modeling module 206 may create a matrix from multiple feature vectors and provide sub-matrices from the matrix to each node in an input layer of a neural network. In some examples, the acoustic modeling module 206 may create sub-matrices from a matrix output by a particular layer in a neural network and provides the sub-matrices to nodes in a subsequent layer in the neural network.

Figure 5:
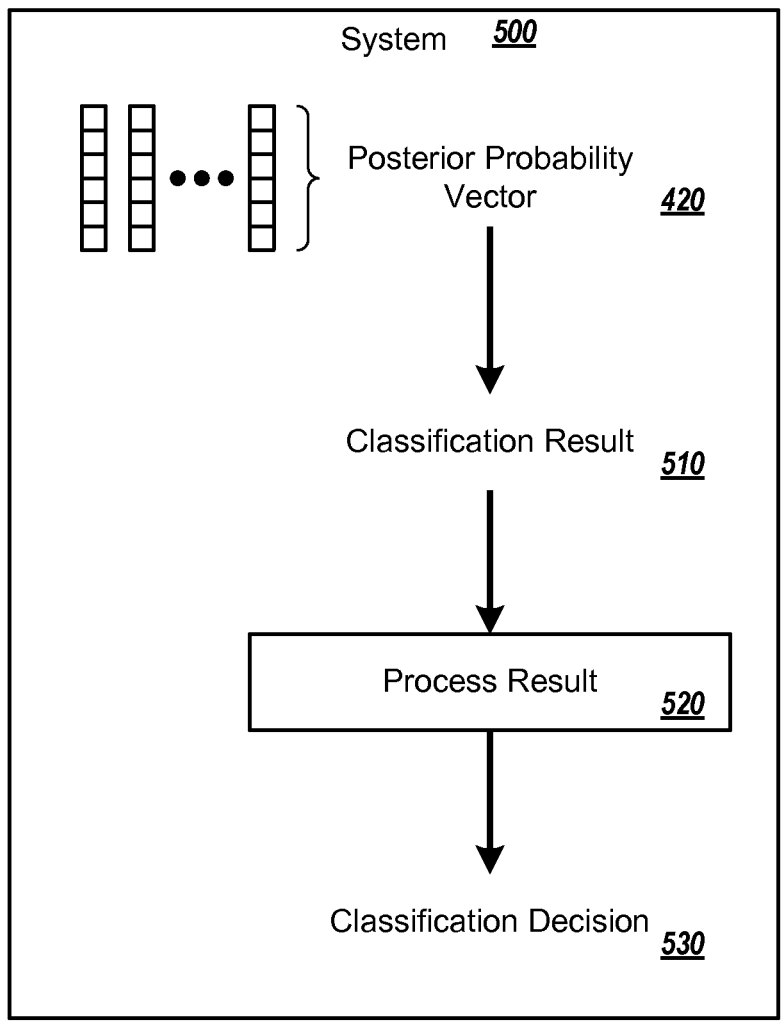
FIG. 5 is a block diagram of an example system for determining when an audio signal encodes a keyword or key phrase.

The acoustic modeling module 206 provides the posterior probability vectors to a posterior handling module 208 that uses the posterior probability vectors to determine a posterior probability, and potentially a confidence score, that indicates whether a keyword or a key phrase is present in the corresponding audio signal, as describe with reference to FIG. 5.

Figure 3:
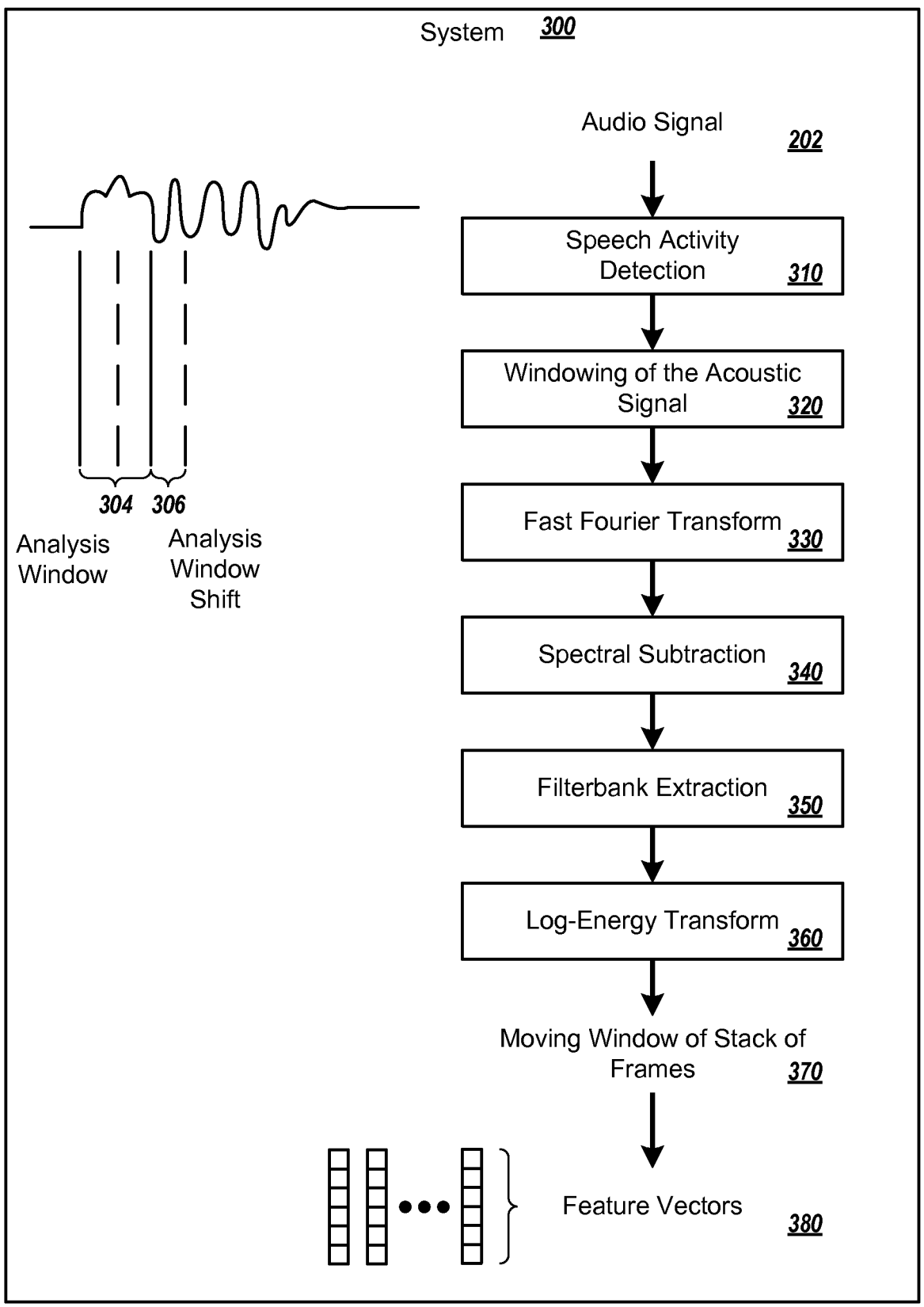
FIG. 3 is a block diagram of an example system for a feature extraction process.

FIG. 3 is a block diagram of an example system 300 for a feature extraction process. For example, the front-end feature extraction module 204 may receive the audio signal 202. The front-end feature extraction module 204 may analyze the audio signal 202 by dividing the audio signal 202 into multiple windows and analyzing each of the windows, e.g., separately. For example, the front-end feature extraction module 204 may identify an analysis window 304 with a specific size, e.g., a 20 or a 25 millisecond time period, for the audio signal 202. The front-end feature extraction module 204 may obtain multiple analysis windows in succession by performing an analysis window shift 306, for example a 10 millisecond time period shift.

One or more analysis windows may overlap. For example, one analysis window may represent audio signal 202 from a start time of 0 milliseconds to an end time of 20 milliseconds and a subsequent analysis window may represent audio signal 202 from a start time of 10 milliseconds to an end time of 30 milliseconds.

The analysis windows 304 are obtained as part of speech activity detection 310, in which the system 300 obtains information about available sound in its environment, e.g., the physical environment surrounding a microphone that captured the audio signal 202. Speech activity detection 310 may occur regardless of whether there is sound in the surrounding environment, or speech activity detection 310 may occur only when the system 300 detects a volume of sound greater than a threshold volume, e.g., in the audio signal 202.

Once speech activity detection 310 occurs, the front-end feature extraction module 204 creates multiple acoustic windows from the acoustic signal 320. In some implementations, each window may have a short time interval, such as 20 milliseconds, that represents characteristics of audio signal 202 over that time interval.

After windowing, the front-end feature extraction module 204 may perform a Fast Fourier transform 330 on the windowed data to analyze the constituent frequencies present in the audio signal.

In some implementations, the front-end feature extraction module 204 may perform spectral substitution 340 to minimize the noise in the windowed data, e.g., the transformed windowed data. The spectral substitution may minimize any potential negative effects of noise in the audio signal 202 during later processing.

The front-end feature extraction module 204 may perform filter bank extraction 350 to separate individual components of the audio data from one another. Each of the individual components generated during filter bank extraction 350 may carry a single frequency sub-band of the audio signal 202 or the windowed data.

In some implementations, the front-end feature extraction module 204 performs a log-energy transform 360 on the received data to normalize the data, e.g., the windowed data. The normalization of the data may enhance relevant features in the data that are used in subsequent processing.

The front-end feature extraction module 204 generates a moving window of a stack of frames 370. The stack of frames 370 may include forty frames, each including data representing 20 milliseconds of the audio signal 202, with a shift of 10 millisecond between consecutive frames. The stack of frames 370 may include as few as two frames or any larger number of frames, such as eleven frames or fifty frames. The size of the stack of frames 370 may depend on the length of the keyword, key phrase, or acoustic unit predicted by the system 200.

The front-end feature extraction module 204 generates multiple feature vectors 380 that represent acoustic features of frames from the audio signal 202 by performing the aforementioned analytical techniques to obtain information about characteristics of the audio signal 202 for successive time intervals. In some examples, each of the feature vectors 380 may be a matrix with values that represent the acoustic features of corresponding frames from the audio signal 202.

Figure 4:
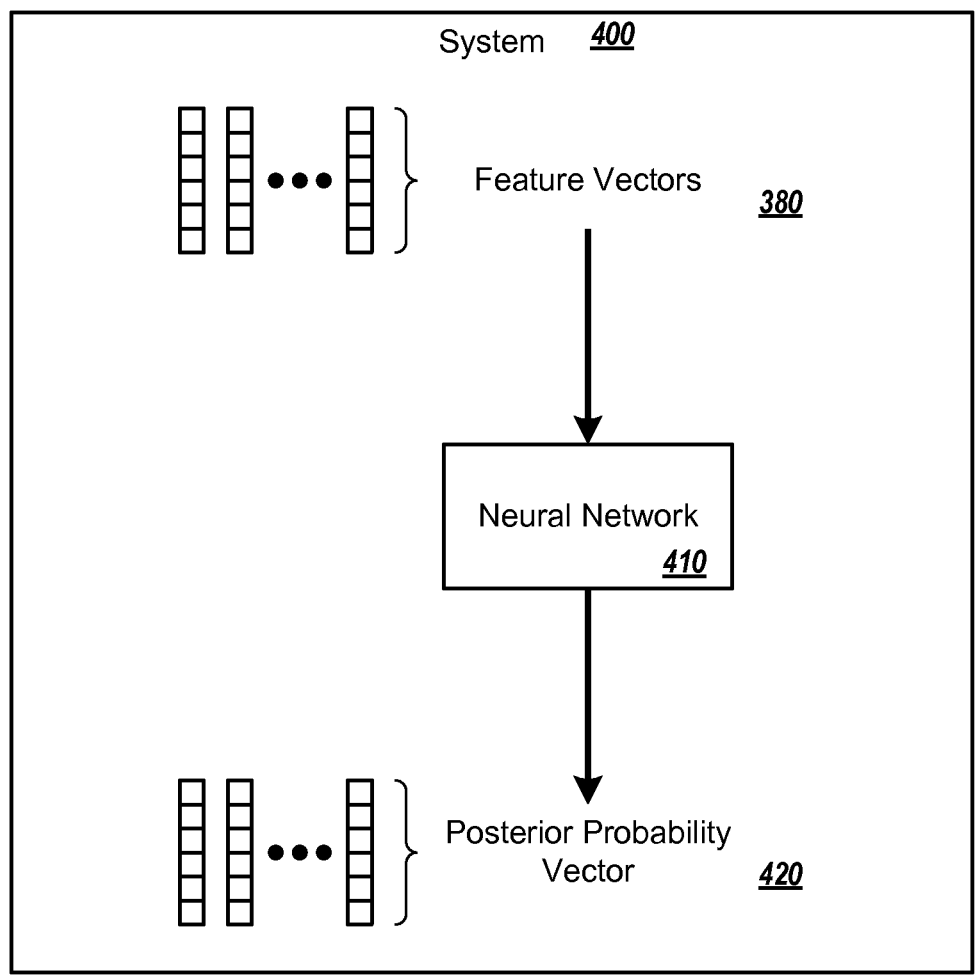
FIG. 4 is a block diagram of an example system for determining a posterior probability vector.

FIG. 4 is a block diagram of an example system 400 for determining a posterior probability vector. The acoustic modeling module 206, shown in FIG. 1, receives the multiple feature vectors 380 from the front-end feature extraction module 204 and generates a corresponding posterior probability vector 420 for each of the feature vectors 380.

For a particular feature vector, the corresponding posterior probability vector 420 includes a value for each of the keywords or key phrases for which the speech recognition system is trained. The value indicates the probability that the frame represented by the feature vector includes at least a portion of an audio signal encoding the corresponding keyword or key phrase.

The acoustic modeling module 206 includes a neural network 410, such as a deep neural network, that generates the corresponding set of posterior probability vectors 420, where each of the posterior probability vectors 420 corresponds with one of the feature vectors 380.

When the acoustic modeling module 206 receives matrices as the feature vectors 380, the acoustic modeling module 206 may divide each of the matrices into multiple sub-matrices and provide each of the sub-matrices to a corresponding set of nodes in the neural network 410. For instance, during training and runtime, the acoustic modeling module 206 divides each matrix into a set of sub-matrices, each of which have the same size and location in all of the matrices, and provides each of the sub-matrices to a set of nodes in an input layer of the neural network 410. Each of the sub-matrices that has a same location in one of the matrices is provided to the same set of nodes in the input layer. For instance, when the neural network 410 provides a top left sub-matrix to a particular node in the input layer during training, then the neural network 410 provides the top left sub-matrix to the particular node during runtime analysis of audio signals.

In some implementations, the acoustic modeling module 206 receives output from a particular layer in the neural network 410, creates sub-matrices using that output, and provides each of the sub-matrices to a subset of the nodes in the next layer in the neural network 410. In some implementations, the acoustic modeling module 206 provides multiple sub-matrices to a particular node, e.g., half or all of the sub-matrices.

The acoustic modeling module 206 is trained to determine whether a stack of feature vectors matches a keyword or key phrase. For example, the neural network 410 may receive a training set of two expected event vectors for the keywords "Okay" and "Google" or one expected event vectors for the key phrase "Okay Google".

The acoustic modeling module 206 processes each of the feature vectors 380 using the neural network 410 to determine if properties of the feature vector match the properties of the expected event vectors for the keywords "Okay" and "Google" and generates a posterior probability for each of the expected event vectors where the posterior probability is representative of the similarity of the properties. For instance, a higher score may represent a greater similarity between a feature vector and an expected event vector compared to a lower score. In some examples, a lower score may represent a greater similarity between a feature vector and an expected event vector compared to a higher score.

When the acoustic modeling module 206 processes a first feature vector and the acoustic modeling module 206 is programmed to identify two keywords, "Okay" and "Google," a first posterior probability vector corresponding to the first feature vector includes at least two posterior probability scores, one for each of the keywords. Each of the posterior probability scores represents the degree of acoustic match between the first feature vector and the expected event vectors.

For example, when the first feature vector is associated with the spoken word "Okay," the scores for "Okay" and "Google" may be 1.0 and 0.0 respectively. In some examples, when the first feature vector is associated with the spoken word "Search," the scores for "Okay" and "Google" are both 0.0. In some examples, when the first feature vector is associated with the spoken word "Google," the scores for "Okay" and "Google" are 0.0 and 0.95 respectively, e.g., when there may be a potentially small difference between the first feature vector and the expected event vector for "Google".

In some implementations, the posterior probability vector 420 may include a "non-keyword" or "filler" posterior probability score. For example, the filler score for a feature vector associated with the spoken word "Okay" would be 0.0 and the filler score for the spoken word "Search" may be 1.0 when the acoustic modeling module 206 includes only two keywords, "Okay" and "Google." In these implementations, when the acoustic modeling module 206 is programmed to identify two keywords, the first posterior probability vector 420 includes at least three scores.

In some implementations, a sum of the posterior probability scores in a posterior probability vector 420 is 1.0. For example, the sum of the posterior probability scores for the spoken word "Okay" would be 1.0 (the "Okay" keyword score)+0.0 (the "Google" keyword score)+0.0 (the filler score)=1.0 and the sum of the scores for the spoken word "Google" may be 0.0 (the "Okay" keyword score)+0.95 (the "Google" keyword score)+0.05 (the filler score)=1.0.

The posterior probability scores may represent the confidence of the acoustic modeling module 206 that the acoustic properties of a feature vector match an expected event vector. In some examples, when the acoustic modeling module 206 identifies a match between a feature vector and an expected event vector, the corresponding posterior probability score might not be 1.0 based on a variance between the feature vector and the expected event vector, such as with the example for the spoken word "Google" above.

In some implementations, the acoustic modeling module 206 may determine a confidence score from a posterior probability score or multiple posterior probability scores.

In some implementations, an expected event vector may represent a key phrase. For example, a first expected event vector may correspond with the key phrase "Okay Google" and a second expected event vector may correspond with the keyword "Google." In this example, when the acoustic modeling module 206 receives a feature vector for the spoken phrase "Okay Google," the posterior probability score for the key phrase "Okay Google" may be 0.7 and the posterior probability score for the key phrase "Google" may be 0.3.

In some implementations, the acoustic modeling module 206 scores a key phrase based on the order of the words or sub-word units in the key phrase. For example, when a key phrase includes the sub-word units "oh," "kay," "goo," and "gal," the acoustic modeling module 206 determines whether a continuous sequence of four feature vectors acoustically match the expected event vectors for the sub-word units "oh," "kay," "goo," and "gal," and assigns a posterior probability score to the sequence of feature vectors accordingly. The acoustic modeling module 206 may generate a posterior probability vector for each set of four continuous feature vectors where the posterior probability vector includes scores that represent the similarity of the feature vectors to the key phrase and any other keywords or key phrases for which the acoustic modeling module 206 is trained. If the acoustic modeling module 206 identifies four feature vectors that are similar to the sub-word units "oh," "kay," "goo," and "gal" but in a different order, the corresponding score in a posterior probability vector is low, e.g., 0.0.

In some implementations, the acoustic modeling module 206 may be trained to identify words or phrases spoken by a particular user. For example, the acoustic modeling module 206 may be trained to identify a pronunciation of the particular user speaking keywords or key phrases such that when a different user speaks the specific keywords or key phrases, the acoustic modeling module 206 generates low keyword posterior probability scores for the keywords or key phrases spoken by the different user, e.g., 0.0. In these implementations, the training data for the acoustic modeling module 206 may include data representing the specific keywords spoken by the particular user and data representing the specific keywords spoken by different users.

FIG. 5 is a block diagram of an example system 500 for determining when an audio signal encodes a keyword or key phrase. For example, the posterior handling module 208 receives the posterior probability vector 420 from the acoustic modeling module 206. In some examples, the posterior handling module 208 may use support vector machine or logistic regression to make a binary decision about whether a keyword or a key phrase was uttered during a time window of the audio signal 202 that is associated with the posterior probability vector 420.

The posterior handling module 208 produces classification result 510. This may be an actual classification decision

530, in terms of a Boolean decision confirming that a keyword or a key phrase was present in the audio signal 202 or not.

In some implementations, the classification result 510 may be a posterior probability score and/or a confidence score, e.g., for a particular one of the keywords or key phrases. For example the posterior probability score may represent the likelihood that a keyword or a key phrase is present in the audio signal 202 or a frame from the audio signal 202. If classification result 510 is a posterior probability score, e.g., and not a binary value, the posterior handling module 208 may process the result 520 to generate the classification decision 530, for example, by comparing the classification result 510 with a threshold value.

In some implementations, the posterior handling module 208 combines corresponding posterior probability scores from multiple posterior probability vectors 420 to determine whether a keyword or key phrase was uttered during a time window of the audio signal 202. For example, the posterior handling module 208 may average twenty posterior probability scores associated with the keyword "Google" from twenty consecutive posterior probability vectors and use the average, e.g., as a single posterior probability for a time period, to determine whether "Google" was spoken during the time period that corresponds with the twenty consecutive posterior probability vectors. In this example, the posterior handling module 208 would also average the posterior probability scores for the other keywords or key phrases represented in the posterior probability vectors, such as the "Okay" keyword posterior probability scores and the filler posterior probability scores.

The posterior handling module 208 may use any appropriate window for the consecutive posterior probability scores. For example, the posterior handling module 208 may average the corresponding scores from eleven consecutive posterior probability vectors.

The posterior handling module 208 uses the combination of the posterior probability scores to determine whether the keyword or key phrase was spoken during the time window of the audio signal 202. For example, the posterior handling module 208 determines whether the combination is greater than a predetermined threshold value and, if so, determines that the keyword or key phrase associated with the combined posterior probability scores was likely spoken during the time window of the audio signal 202.

In some implementations, the posterior handling module 208 combines corresponding posterior probability scores from multiple posterior probability vectors 420 by determining a geometric mean, a sum, or a product of the scores. In some examples, the posterior handling module 208 determines a maximum score for each of the corresponding posterior probability scores from the posterior probability vectors.

In some implementations, the posterior handling module 208 determines a maximum value of the posterior probability scores corresponding to a particular keyword or key phrase as the combination of the posterior probability scores. For example, the posterior handling module 208 may determine a maximum posterior probability score value from one-hundred consecutive posterior probability vectors 420 and use the maximum value when determining whether the audio signal 202 includes the keyword or key phrase. In some examples, when the maximum value is greater than a predetermined threshold, the posterior handling module 208 determines that the keyword or key phrase was included in the audio signal 202.

The posterior handling module 208 may move a window and/or may use windows of different sizes when determining whether a keyword or key phrase was spoken during a different portion of the audio signal 202. For example, the posterior handling module 208 may look at different overlapping or non-overlapping windows and determine a combination of the posterior probability scores for the different window.

In some implementations, the posterior handling module 208 enforces the order of words or sub-word units associated with keywords or key phrases. For example, when the acoustic modeling module generates posterior probability scores for words that are portions of a key phrase, the posterior handling module 208 determines whether the portions of the key phrase occurred in the correct order when determining whether the key phrase was recorded in the audio signal 202.

For example, when the key phrase is "Okay Google" and the posterior handling module 208 receives a first posterior probability vector with a score of 1.0 for "Okay" and a second posterior probability vector with a score of 1.0 for "Google," where the first posterior probability vector corresponds with a portion of the audio signal immediately prior to the portion of the audio signal that corresponds with the second posterior probability vector without any intermediate portions, the posterior handling module 208 determines that the key phrase "Okay Google" was recorded in the audio signal 202. The posterior handling module 208 may perform a similar process for portions of keywords, such as "goo" and "gle" or "goo" and "gal".

In some examples, when the posterior handling module 208 determines that a first posterior probability vector has a score of 1.0 for "Google" and a second posterior probability vector has a score of 1.0 for "Okay," where the second posterior probability vector corresponds with a later portion of the audio signal 202 than the first posterior probability vector and/or at least one feature vector corresponds with a portion of the audio signal 202 between the portions of the audio signal that correspond with the first and second posterior probability vectors. In these examples, the posterior handling module 208 determines that the key phrase "Okay Google" was not recorded in those portions of the audio signal 202.

Figure 6:
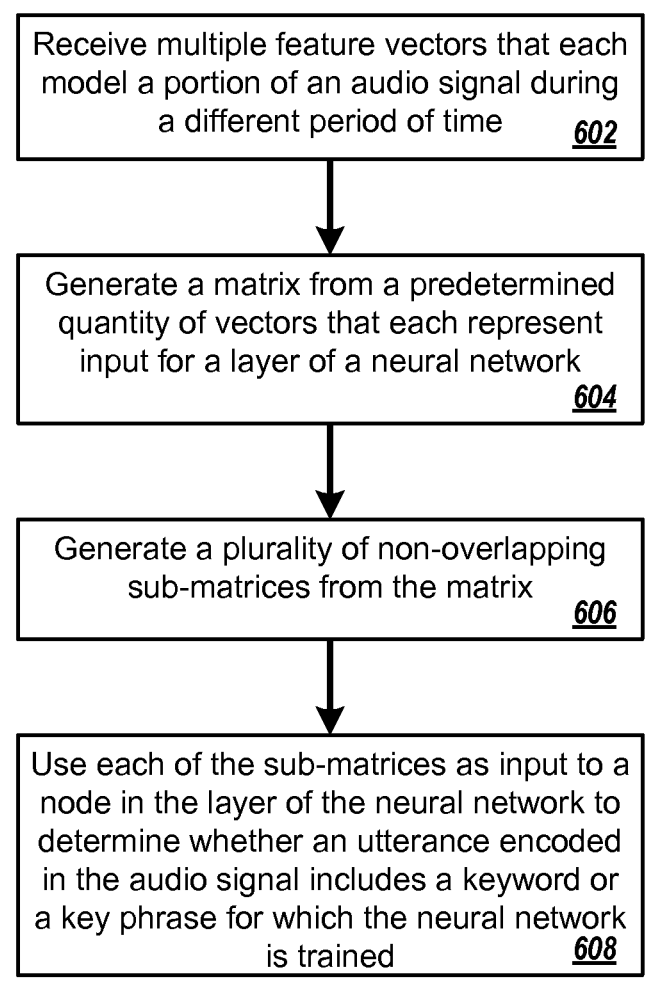
FIG. 6 is a flowchart of an example process for detecting keyword utterances in an audio signal.

FIG. 6 is a flowchart of an example process 600 for detecting keyword utterances in an audio signal.

The process receives multiple feature vectors that each model a portion of an audio signal during a different period of time (602). The process may be used to determine whether the audio signal encodes a particular keyword or key phrase. For example, step 602 may be performed as described with reference to FIG. 3, such that the front-end feature extraction module 204 processes the audio signal 202 to yield the feature vectors 380.

The process generates a matrix from a predetermined quantity of vectors that each represent input for a layer of a neural network (604). For instance, the speech recognition system may use a subset of the feature vectors to create the matrix.

In some examples, the speech recognition system receives output from a particular layer in a neural network, creates a matrix from the output, and generates sub-matrices from that matrix. In these examples, the speech recognition system may receive the feature vectors, provide the feature vectors or values from the feature vectors to a neural network input layer, and use the output from the input layer, or another layer in the neural network, to create the matrix.

The process generates a plurality of non-overlapping sub-matrices from the matrix (606). For instance, the speech recognition system generates sub-matrices from the matrix that includes values from the feature vectors or output values from nodes in a layer of the neural network.

The process uses each of the sub-matrices as input to a node in the layer of the neural network to determine whether an utterance encoded in the audio signal includes a keyword or a key phrase for which the neural network is trained (608). For example, the neural network may use the sub-matrices as input to an input layer in the neural network and processes the output from the input layer using the other layers in the neural network. In some examples, the neural network may use the sub-matrices as input to another layer in the neural network. The neural network determines output for an output layer in the neural network and may provide the output to a posterior handling module.

For instance, the neural network generates a posterior probability vector for each of the feature vectors. Each posterior probability vector includes a set of posterior probability scores that characterize an acoustic match between the corresponding feature vector and a set of expected event vectors. Each of the expected event vectors corresponds with one of the posterior probability scores and defines acoustic properties of at least a portion of a keyword.

The speech recognition system may determine that a particular word was encoded in the audio signal. For example, the posterior handling module determines that the particular word was encoded in the audio signal during an overall period of time modeled by the feature vectors by combining corresponding posterior probability scores from the posterior probability vectors. The particular word corresponds with at least one keyword or with at least a portion of one of the key phrases, a corresponding one of the expected event vectors, and a corresponding one of the scores in the posterior probability vector.

The speech recognition system determines that a key phrase, which may include one or more words, was encoded in the audio signal. For example, the posterior handling module determines that a predetermined key phrase was encoded in the audio signal during the overall period of time modeled by the feature vectors. The key phrase includes the particular word and potentially another word that corresponds to at least another portion of the key phrase and a corresponding one of the expected event vectors.

The key phrase represents a key phrase for which the speech recognition system, e.g., the acoustic modeling module, is programmed to identify. For example, the particular word and the other word might not be keywords alone but combine to form a key phrase that is of importance for the posterior handling module when the particular word and the other word are identified in sequence.

For example, when the posterior handling module determines that the other word occurred in the audio signal immediately prior to the particular word, the posterior handling module determines that the audio signal does not include the key phrase, assuming no other specific words were identified for which the acoustic modeling module was programmed.

When the posterior handling module identifies the particular word immediately prior to the other word, without any intervening words and based on the posterior probability vectors, the posterior handling module determines that the audio signal encodes a key phrase and provides data associated with the key phrase to another module in a system, e.g., that performs an action based on the keyword or the key phrase.

In some implementations, the process 600 can include additional steps, fewer steps, or some of the steps can be divided into multiple steps. For example, the acoustic modeling module may perform steps 604 through 608 without performing step 602.

In some implementations, the acoustic modeling module uses a neural network, e.g., a deep neural network, to generate the posterior probability vector. For example, the neural network may be trained, prior to the generation of the posterior probability vector, with a set of training feature vectors that includes the expected event vectors. In some examples, each of the set of training feature vectors includes properties of spoken sub-word units associated with keywords or key phrases. The training feature vectors includes the properties of the expected event vectors such that training with the expected event vectors teaches the neural network the combination of properties to identify that correspond with each of the expected event vectors and the sub-word units of the keywords and key phrases.

In some implementations, the set of training feature vectors includes multiple general feature vectors where each of the general feature vectors is different from all of the expected event vectors and corresponds with words different from the keywords. For example, the general feature vectors include properties of sub-word units not included in any of the keywords or key phrases the acoustic modeling module identifies, e.g., general speech that does not include the keywords or key phrases. The neural network may use the general feature vectors to identify combinations of properties that are not associated with any of the expected event vectors, e.g., as negative training data. The negative training data may be associated with a filler category or posterior probability determined by the neural network.

Figure 7:
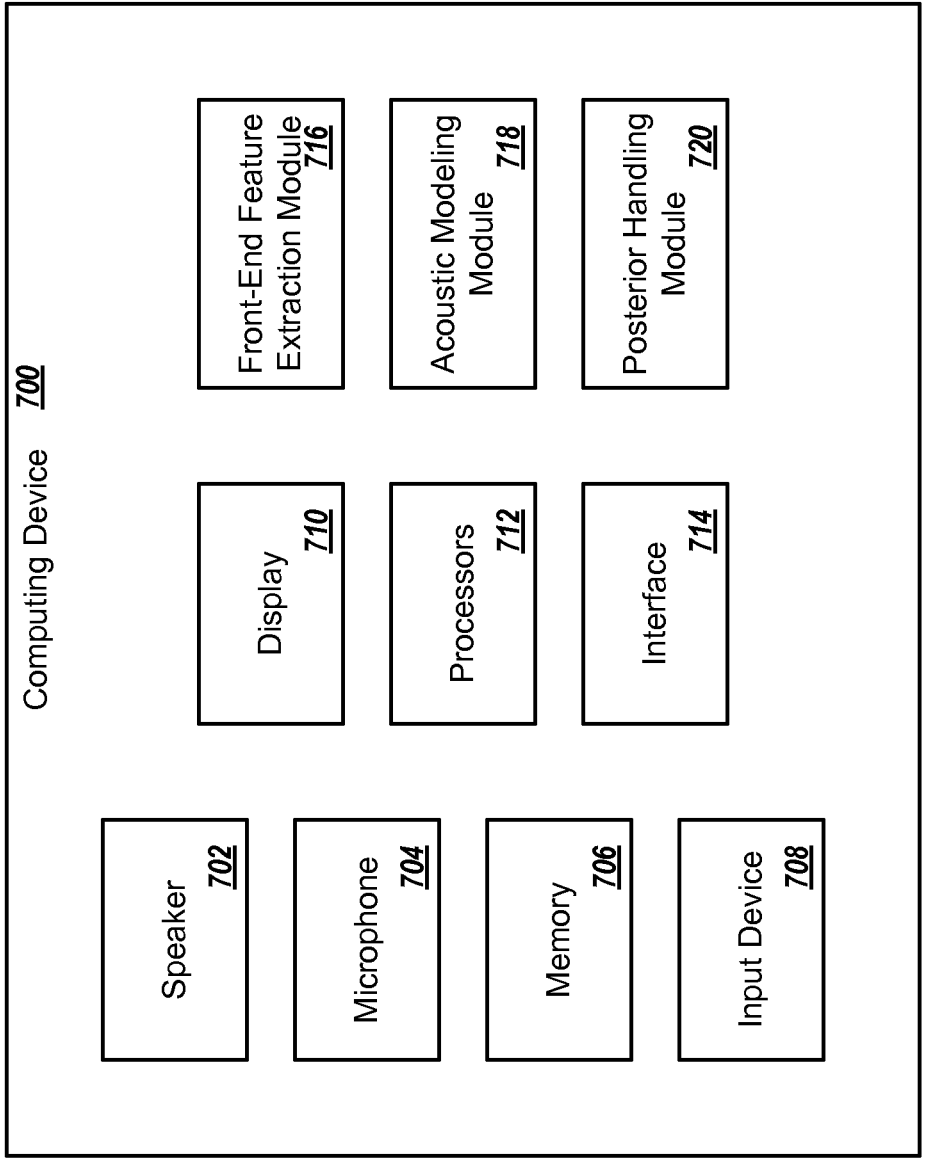
FIG. 7 is a block diagram of an example computing device that can detect keyword and key phrase utterances in an audio signal.

FIG. 7 is a block diagram of an example computing device 700 that can detect keyword and key phrase utterances in an audio signal. The computing device 700 contains a variety of constituent parts and modules that may be implemented through appropriate combinations of hardware, firmware, and software that allow the computing device 700 to function as an embodiment of appropriate features.

The computing device 700 contains one or more processors 712 that may include various hardware devices designed to process data. The processors 712 are communicatively coupled to other parts of computing device 700. For example, the processors 712 may be coupled to a speaker 702 and a microphone 704 that allow output and input of audio signals to and from an area that physically surrounds the computing device 700. The microphone 704 may provide the raw signals that capture aspects of the audio signal 202 that are processed in other portions of the computing device 700.

The computing device 700 may include a memory 706. The memory 706 may include a variety of memory storage devices, such as persistent storage devices that allow permanent retention and storage of information manipulated by the processors 712.

An input device 708 allows the receipt of commands by the computing device 700 from a user, and an interface 714 allows computing device 700 to interact with other devices to allow the exchange of data. The processors 712 may be communicatively coupled to a display 710 that provides a graphical representation of information processed by the computing device 700 for the presentation to a user.

The processors 712 may be communicatively coupled to a series of modules that perform the functionalities necessary to implement the method of embodiments that is presented in FIG. 6. These modules include a front-end feature extraction module 716, which performs as described with reference to FIG. 3, an acoustic modeling module 718, which performs as described with reference to FIG. 4, and a posterior handling module 720, which performs as described with reference to FIG. 5.

The acoustic modeling module 718 may use a deep neural network, e.g., described with reference to FIG. 1 above. For instance, the deep neural network is specific to a particular set of keywords and key phrases and, for each input feature vector, outputs a posterior probability score vector with values for each of the keywords and key phrases.

As discussed above, the task of keyword detection is an important component in some speech recognition applications. For example, when the vocabulary size is limited, or when the task requires activating a device, for example, a phone, by saying a word, keyword detection is applied to classify whether an utterance contains a word or not and whether the word is a particular word or part of a phrase for which the device has been programmed to identify.

For example, the task performed by some embodiments includes detecting a single word, for example, "Google," that will activate a device from a standby mode to perform a task. Some tasks may include presenting content to a user, e.g., presenting a particular application or user interface, performing an action for a particular application, e.g., playing music or launching the particular application. The device continuously monitors received audio signals for the predetermined keywords and/or key phrases.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 8:
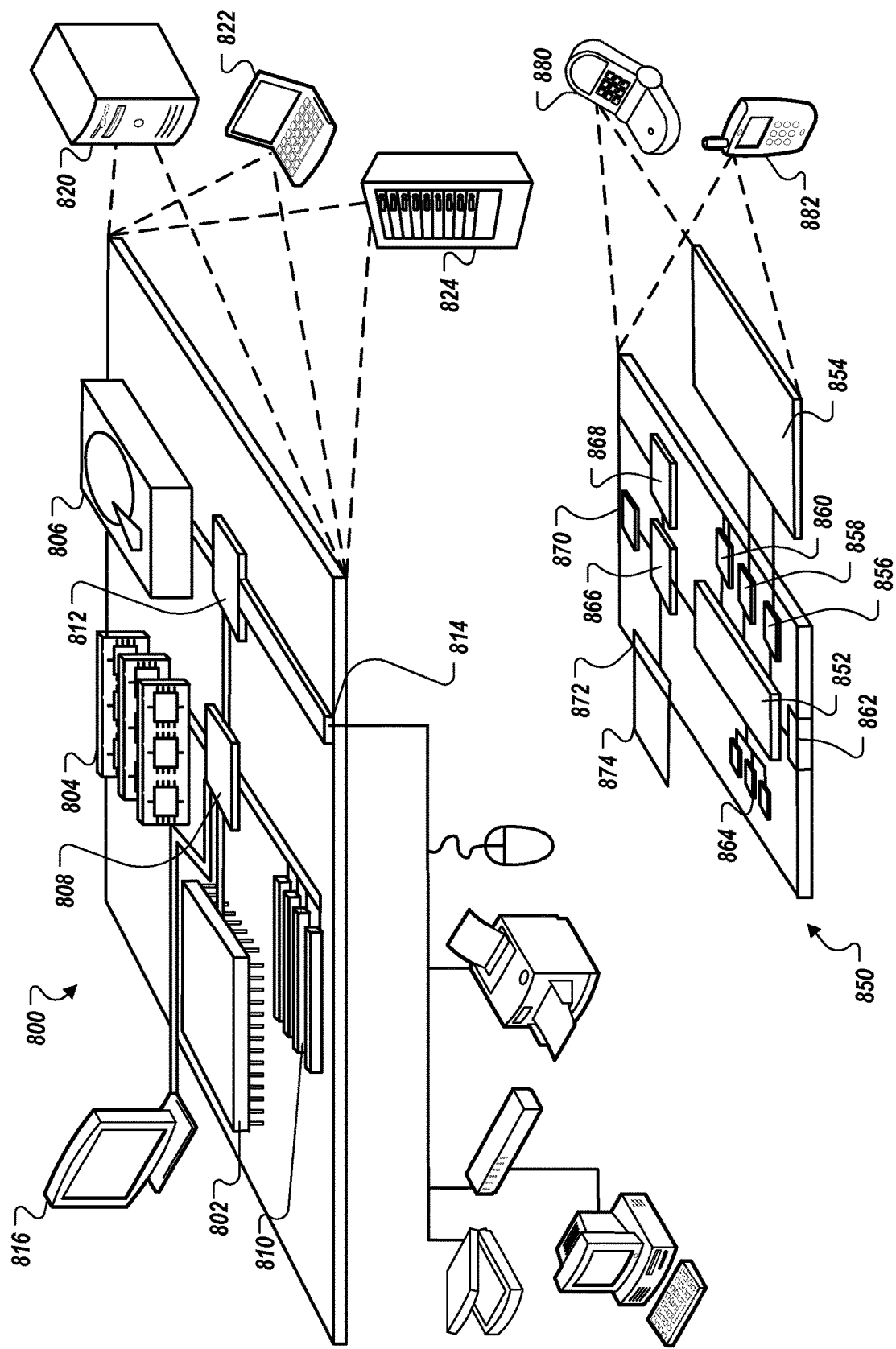
FIG. 8 is a block diagram of computing devices that may be used to implement the systems and methods described in this document, as either a client or as a server or plurality of servers.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   storing, by a computing device, a spoken keyword detection model comprising a neural network;
   generating, by the computing device, a set of input values for the neural network of the spoken keyword detection model, wherein the set of input values includes values from a predetermined quantity of vectors that indicate acoustic characteristics of an utterance;
   providing, by the computing device, each of the values in the set of input values to an input layer of the neural network;
   providing, by the computing device, non-overlapping proper subsets of the set of input values as input to nodes in a particular layer of the neural network,
     wherein each of the nodes receives a different non-overlapping proper subset of the set of input values, each of the non-overlapping proper subsets comprising multiple values from the set of input values, and
     wherein, for each of the nodes, the only values from the set of input values used to provide input to the node are the values in the non-overlapping proper subset for the node;
   generating, by the computing device, one or more outputs of the spoken keyword detection model, wherein the one or more outputs of the spoken keyword detection model are based on output of the neural network that was generated in response to providing the non-overlapping proper subsets of the set of input values as input to the nodes in the particular layer of the neural network;
   based on the one or more outputs of the spoken keyword detection model, determining, by the computing device, that the utterance comprises a predetermined keyword; and
   in response to determining that the utterance comprises the predetermined keyword, changing, by the computing device, an operating state of the computing device.

2. The method of claim 1, wherein
   the set of input values includes values from a predetermined quantity of feature vectors that each model a portion of audio data encoding the utterance.

3. The method of claim 1, wherein a size of each of the non-overlapping proper subsets is the same.

4. The method of claim 1, wherein the set of input values includes values from a predetermined quantity of sequential vectors from an ordered series of vectors representing the utterance.

5. The method of claim 1, wherein providing the non-overlapping proper subsets of the set of input values as input to the nodes in the particular layer of the neural network comprises providing the non-overlapping proper subsets of the set of input values as input to a predetermined quantity of nodes in the particular layer of the neural network.

6. The method of claim 1, wherein providing the non-overlapping proper subsets of the set of input values as input to the nodes in the particular layer of the neural network comprises providing a non-overlapping proper subset of the set of input values as input to a plurality of adjacent nodes in the particular layer of the neural network.

7. The method of claim 1, comprising:
   wherein determining that the utterance comprises the predetermined keyword is performed using the output from the nodes in the neural network; and
   wherein the neural network has been trained to recognize the predetermined keyword.

8. The method of claim 1, wherein changing the operating state of the computing device comprises exiting, by the computing device, a standby state.

9. The method of claim 7, comprising, in response to determining that the utterance comprises the predetermined keyword, presenting, by the computing device, content to a user of the device.

10. The method of claim 7, comprising, in response to determining that the utterance comprises the predetermined keyword, performing, by the computing device, an action for a particular application.

11. The method of claim 10, wherein performing the action for the particular application comprises launching, by the computing device, the particular application.

12. The method of claim 1, wherein the vectors each model a portion of audio data encoding the utterance;
   wherein the set of input values comprises values that respectively correspond to different frequencies or frequency ranges of content of the audio data;
   wherein each of the non-overlapping proper subsets include only values that correspond to proper subset of the different frequencies or frequency ranges.

13. One or more non-transitory computer-readable media storing software comprising instructions executable by one or more computing devices which, upon such execution, cause the one or more computing devices to perform operations comprising:
   storing, by the one or more computing devices, a spoken keyword detection model comprising a neural network;
   generating, by the one or more computing devices, a set of input values for the neural network of the spoken keyword detection model, wherein the set of input values includes values from a predetermined quantity of vectors that indicate acoustic characteristics of an utterance;

providing, by the one or more computing devices, each of the values in the set of input values to an input layer of the neural network;

providing, by the one or more computing devices, non-overlapping proper subsets of the set of input values as input to nodes in a particular layer of the neural network, wherein each of the nodes receives a different non-overlapping proper subset of the set of input values, each of the non-overlapping proper subsets comprising multiple values from the set of input values, and wherein, for each of the nodes, the only values from the set of input values used to provide input to the are proper subset for the node;

generating, by the one or more computing devices, one or more outputs of the spoken keyword detection model, wherein the one or more outputs of the spoken keyword detection model are based on output of the neural network that was generated in response to providing the non-overlapping proper subsets of the set of input values as input to the nodes in the particular layer of the neural network;

based on the one or more outputs of the spoken keyword detection model, determining, by the one or more computing devices, that the utterance comprises a predetermined keyword; and in response to determining that the utterance comprises the predetermined keyword, changing, by the one or more computing devices, an operating state of at least one of the one or more computing devices.

14. The one or more non-transitory computer-readable media of claim 13, wherein a size of each of the non-overlapping proper subsets is the same.

15. The one or more non-transitory computer-readable media of claim 13, wherein the set of input values includes values from a predetermined quantity of sequential vectors.

16. The one or more non-transitory computer-readable media of claim 13, wherein the set of input values comprises values that respectively correspond to different frequencies; and wherein each of the non-overlapping proper subsets include values corresponding to only a proper subset of the different frequencies.

17. A system comprising:

one or more computers and one or more storage devices storing instructions that are operable, when executed by the one or more computing devices, to cause the one or more computing devices to perform operations comprising:

storing, by the one or more computing devices, a spoken keyword detection model comprising a neural network;

generating, by the one or more computing devices, a set of input values for the neural network of the spoken keyword detection model, wherein the set of input values includes values from a predetermined quantity of vectors that indicate acoustic characteristics of an utterance;

providing, by the one or more computing devices, each of the values in the set of input values to an input layer of the neural network;

providing, by the one or more computing devices, non-overlapping proper subsets of the set of input values as input to nodes in a particular layer of the neural network, wherein each of the nodes receives a different non-overlapping proper subset of the set of input values, each of the non-overlapping proper subsets comprising multiple values from the set of input values, and wherein, for each of the nodes, the only values from the set of input values used to provide input to the node are the values in the non-overlapping proper subset for the node;

generating, by the one or more computing devices, one or more outputs of the spoken keyword detection model, wherein the one or more outputs of the spoken keyword detection model are based on output of the neural network that was generated in response to providing the non-overlapping proper subsets of the set of input values as input to the nodes in the particular layer of the neural network;

based on the one or more outputs of the spoken keyword detection model, determining, by the one or more computing devices, that the utterance comprises a predetermined keyword; and in response to determining that the utterance comprises the predetermined keyword, changing, by the one or more computing devices, an operating state of at least one of the one or more computing devices.

18. The system of claim 17, wherein generating the set of input values comprises stacking the predetermined quantity of vectors to generate the set of input values.

19. The system of claim 17, wherein each value in the set of input values is included in at least one of the non-overlapping proper subsets.

* * * * *

UNITED STATES PATENT AND TRADEMARK OFFICE
CERTIFICATE OF CORRECTION

PATENT NO.         : 10,580,401 B2
APPLICATION NO.    : 14/613493
DATED              : March 3, 2020
INVENTOR(S)        : Ignacio Lopez Moreno et al.

Page 1 of 1

It is certified that error appears in the above-identified patent and that said Letters Patent is hereby corrected as shown below:

In the Claims

At Column 23, Claim number 13, Line number 17, after "input to the" insert --node--.

Signed and Sealed this
Fourteenth Day of July, 2020

Andrei Iancu
*Director of the United States Patent and Trademark Office*